United States Patent [19]

Ueshima et al.

[11] 4,132,750

[45] Jan. 2, 1979

[54] HIGH IMPACT RESIN COMPOSITION

[75] Inventors: Takashi Ueshima, Yokohama; Toshiro Yokoyama, Kawasaki; Shoichi Kobayashi, Yokohama, all of Japan

[73] Assignee: Showa Denko K.K., Tokyo, Japan

[21] Appl. No.: 780,121

[22] Filed: Mar. 22, 1977

Related U.S. Application Data

[63] Continuation-in-part of Ser. No. 501,243, Aug. 28, 1974, abandoned.

[30] Foreign Application Priority Data

Aug. 31, 1973 [JP] Japan .................................. 48-97233
Dec. 17, 1973 [JP] Japan .................................. 48-139604

[51] Int. Cl.$^2$ ...................... C08L 87/00; C08L 23/28; C08L 9/00

[52] U.S. Cl. ................................ 260/887; 260/897 C; 260/899

[58] Field of Search ............... 260/890, 893, 898, 899, 260/897 C, 887

[56] References Cited

U.S. PATENT DOCUMENTS 3,856,758  12/1974  Ueshima et al. .................. 526/75 X

*Primary Examiner*—Wilbert J. Briggs, Sr.
*Attorney, Agent, or Firm*—Carroll F. Palmer

[57] ABSTRACT

A high impact resin composition which comprises 100 parts by weight of polymers obtained by ring-opening polymerization of cyano- or ester-substituted norbornene derivatives bearing at least one nitrile group, a substituent containing the nitrile group, an ester group or a substituent containing the ester group and 2 to 25 parts by weight of rubber-like materials.

2 Claims, No Drawings

HIGH IMPACT RESIN COMPOSITION

CROSS-REFERENCE TO RELATED APPLICATION

This is a Continuation-in-part application of U.S. Ser. No. 501,243 filed Aug. 28, 1974, now abandoned.

BACKGROUND OF THE INVENTION

1. Field of the Invention

This invention relates to a high impact resin composition, and more particularly to a high impact resin composition containing a polymer prepared by ring-opening polymerization of cyano- or ester-substituted norbornene derivatives.

2. Description of the Prior Art

An article by R. E. Rinechart appearing in the Journal of Polymer Science (1969) Part C, No. 27, pages 7 to 25 and the Japanese Patent Publications Nos. 22705/67 and 7552/68 point out that a new type of polymer can be obtained by subjecting to ring-opening polymerization cycloolefins such as cyclooctene, cyclopentene, cyclobutene, cyclooctadiene and norbornene in an organic solvent selected from aromatic hydrocarbons such as toluene, aliphatic hydrocarbons such as n-heptane and lower alcohols such as methyl alcohol, using a catalyst prepared from halides of noble metals such as ruthenium, osmium and iridium or halides of transition metals such as titanium, molybdenum, tungsten and vanadium.

However, a joint report by Francis W. Michelotti and William P. Keaveney appearing in the Journal of Polymer Science (1965), Part A, Vol. 3, pages 895 to 905 discloses that 5-chloromethyl-2-norbornene, a derivative of norbornene, can indeed be formed into fibrous polymer when subjected to ring-opening polymerization, using a catalyst of ruthenium compounds, whereas 5-cyano-2-norbornene, namely, 5-cyano-bicyclo [2,2,1]-heptene-2 can not provide a polymer even when subjected to ring-opening polymerization, using a catalyst of compounds of ruthenium, osmium or iridium. As seen from the foregoing description, some of the derivatives of cyclo-olefins, particularly those of norbornene can be made into polymers by ring-opening polymerization, using a certain kind of a catalytic system, whereas the others of said norbornene derivatives can not be expected to admit of ring-opening polymerization even when the same kind of catalytic system is used.

The present inventors have conducted studies on the ring-opening polymerization of cyano- and ester-substituted norbornene derivatives. As a result, it has been found that polymers can be prepared by ring-opening polymerization of the above-mentioned norbornene derivatives, using a catalytic system consisting of compounds of tungsten and/or those of molybdenum and organic aluminium compounds. It has also been disclosed that said polymer can not be produced by ring-opening polymerization of cyano- or ester-substituted norbornene derivatives, using a catalytic system consisting of compounds of titanium and/or those of vanadium and organic aluminium compounds.

The above-mentioned polymers prepared by ring-opening polymerization of cyano- or ester-substituted norbornene derivatives can be manufactured on an industrial scale and have not only more excellent mechanical properties such as impact strength, low-temperature impact strength and hardness, but also transparency and moldability than commonly used synthetic resins such as polypropylene and polyvinyl chloride, thus admitting of application in the various forms, for example, containers or films by such working process as injection molding or extrusion molding customarily practised in the field of synthetic resins.

Though possessed of many superior properties to other synthetic resins in common use, the above-mentioned polymers prepared by ring-opening polymerization of cyano- and ester-substituted norbornene derivatives can not always be deemed to present satisfactory workability and impact strength when molded into, for example, mechanical parts, window frames, helmets and light covers (such as those for covers of street lamps).

SUMMARY OF THE INVENTION

The object of this invention is to provide a high impact resin composition be resolving these problems accompanying the prior art. A high impact resin composition according to this invention comprises 100 parts by weight of polymers prepared by ring-opening polymerization of at least one kind of norbornene derivatives and 1 to 50 parts by weight of rubber-like material, said norbornene derivatives being expressed by a general formula

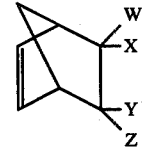

where: W, X, Y and Z are radicals selected from the group consisting of hydrogen, nitrile group, substituent containing nitrile group, ester group, substituent containing ester group, alkyl radical having 1 to 20 carbon atoms, alkenyl radical having 2 to 20 carbon atoms, aryl radical having 6 to 20 carbon atoms, and aralkyl radical having 7 to 20 carbon atoms; and at least one of said W, X, Y and Z is a radical selected from the group consisting of nitrile group, substituent containing nitrile group, ester group and substituent containing ester group.

A resin composition of this invention is possessed of not only prominent impact strength, but also high surface hardness, softening point, weatherability and transparency. Synthetic resin blended with rubber-like material generally decreases in tensile strength, surface hardness and softening point, though increasing in impact strength. In contrast, a resin composition according to this invention is characterized in that it displays higher impact strength than polymers prepared by ring-opening polymerization of norbornene derivatives, without being much reduced in tensile strength, surface hardness and softening point.

DESCRIPTION OF PREFERRED EMBODIMENTS

Cyano- and ester-substituted norbornene derivatives used as a monomer in this invention contain at least one polar group selected from the group consisting of nitrile group, substituent including nitrile group, ester group and substituent including ester group in the position of 5 and/or 6 of bicyclo [2,2,1]-heptene-2 as indicated in the following general formula representing the chemical structure of said monomer:

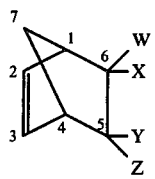

where: W, X, Y and Z represent the aforementioned radicals.

The aforesaid substituents containing nitrile group include the cyano methyl radical, cyanoethyl radical, cyanopropyl radical, cyano-n-butyl radical, cyano-isobutyl radical and ω-cyano-n-heptyl radical. The substituents containing ester group include acetoxymethyl radical, stearoxymethyl radical, γ-acetoxypropyl radical, ω-methoxy-carbonyl-n-heptyl radical and ω-pentyloxycarbonyl-n-heptyl radical. The hydrocarbon radicals, namely the alkyl radical and so on, include the methyl radical, ethyl radical, propyl radical, n-butyl radical, isobutyl radical, octyl radical, decyl radical, phenyl radial, cyclohexyl radical and 2-octenyl radical.

The monomers whose chemical structure may be expressed by the above-mentioned general formula can be prepared by reacting cyclopentadiene with definic compounds containing the nitrile group or the ester group, namely, by Diels-Alder reaction (refer to an article by H. L. Holmes appearing in "Organic Reactions", Vol. 4, pages 60 to 173, published in 1948 by John Wiley and Sons, Inc.). Said monomers may also be obtained by reacting dicyclopentadiene with olefinic compounds containing the nitrile group or the ester group. The olefinic compounds bearing the nitrile group which may be used in said reaction include acrylonitrile, methacrylonitrile, α-n-octyl acrylonitrile, vinylidene cyanide, fumaronitrile, maleonitrile, allylcyanide, cinnamonitrile and linolonitrile. From said olefinic compounds bearing the nitrile group are obtained in the name of cyano-substituted norbornene derivatives through the aforesaid Diels-Alder reaction, 5-cyano bicyclo [2,2,1]-heptene-2, 5-cyano-5-methyl bicyclo [2,2,1]-heptene-2, 5-cyano-5-n-octyl bicyclo [2,2,1]-heptene-2, 5,5-dicyano bicyclo [2,2,1]-heptene-2, 5,6-dicyano bicyclo [2,2,1]-heptene-2, 5-cyano-6-phenyl bicyclo [2,2,1]-heptene-2, and a mixture of 5-ω-cyano-n-heptyl, 6-n-2-octenyl bicyclo [2,2,1]-heptene-2 and 5-ω-cyano-2-decenyl, 6-n-pentyl bicyclo [2,2,1]-heptene-2.

Any olefinic compound containing an ester group may be available for the above-mentioned reaction. The typical olefinic compounds containing an ester group include α, β-unsaturated carboxylic acid esters such as methyl acrylate, ethyl acrylate, butyl acrylate, allyl acrylate, methyl methacrylate, hexyl crotonate, ethyl cinnamate, octyl 2-decenoate and dimethyl itaconate; 1,2-disubstituted conjugated carboxylic acid esters such as dimethyl maleate and diethyl fumarate; 1,1-disubstituted conjugated carboxylic acid esters such as dibutyl methylene malonate and dimethyl propylidene malonate; nonconjugated unsaturated carboxylic acid esters such as methyl oleate and methyl linolate; and unsaturated carboxylic acid esters such as allyl acetate, vinyl acetate, allyl propionate and allyl stearate.

Typical among the ester-substituted norbornene derivatives prepared by the above-mentioned process are 5-methoxy carbonylbicyclo [2,2,1]-heptene-2; 5-ethoxycarbonyl-bicyclo [2,2,1]-heptene-2; 5-butoxycarbonyl-bicyclo [2,2,1]-heptene-2; 5-allyloxycarbonyl-bicyclo [2,2,1]-heptene-2; 5-methyl-5-methoxycarbonyl-bicyclo [2,2,1]-heptene-2; 5-hexyloxycarbonyl-6-methyl-bicyclo [2,2,1]-heptene-2; 5ethoxycarbonyl-6-phenyl-bicyclo [2,2,1]-heptene-2; 5-heptyl-6-octyloxycarbonyl-bicyclo [2,2,1]-heptene-2; 5-methoxycarbonyl-6-methoxycarbonylmethyl-bicyclo [2,2,1]-heptene-2; 5,6dimethoxycarbonyl-bicyclo [2,2,1]-heptene-2; 5,6-diethoxycarbonyl-bicyclo [2,2,1]-heptene-2; 5,5-dibutoxycarbonyl-bicyclo [2,2,1]-heptene-2; 5-methyl-6,6-dimethoxycarbonyl-bicyclo [2,2,1]-heptene-2; 5-ω-methoxycarbonyl heptyl-6-octyl-bicyclo [2,2,1]-heptene-2; 5-ω-methoxycarbonyl-2-decenyl-6-pentyl-bicyclo [2,2,1]-heptene-2; 5-ω-methoxycarbonyl heptyl-6-2-octenyl-bicyclo [2,2,1]-heptene-2; 5-acetoxymethyl-bicyclo [2,2,1]-heptene-2; 5-acetoxy-bicyclo [2,2,1]-heptene-2; 5-propionoxymethyl-bicyclo [2,2,1]-heptene-2; and 5-stearoxymethyl-bicyclo [2,2,1]-heptene-2. The nitrile group, ester group and substituent having nitrile or ester group may take the endo or exo position. Though the cyano- and ester-substituted norbornene derivatives consist of two groups of isomers represented by the endo and exo positions occupied by the groups or substituents, yet said different groups of isomers can be effectively separated from each other by precision distillation. The endo type isomer, for example, 5-cyano-bicyclo [2,2,1]-heptene-2 remains solid at room temperature and has a boiling point of 88° C in an atmosphere reduced to 12 mm Hg. The exo type is a colorless liquid at room temperature, and has a boiling point of 80.5° C in an atmosphere reduced to 12 mm Hg, a density of 1.0065 g/cc at 20° C and a refractive index of 1.4862 with respect to the D line of sodium at 20° C. Said isomers can be used in a separated or nonseparated state in performing the ring-opening polymerization. It is possible to use a single or two or more types of the above-mentioned cyano- and ester-substituted norbornene derivatives.

The polymers of norbornene derivatives can be prepared by ring-opening polymerization of the various type of norbornene derivatives obtained by the above-mentioned process in the presence or absence of an inert organic solvent using a catalytic system consisting of a mixture of organic aluminum compounds and compounds of tungsten and/or those of molybdenum or a catalytic system consisting of said mixture to which there is added at least one compound selected from the group consisting of water, peroxides, epoxides, organic halides, acetal compounds, alcoholic compounds, phenolic compounds, orthoformic acid esters and orthocarboxylic acid esters.

The ring-opening polymerization is effected through the following process:

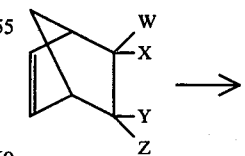

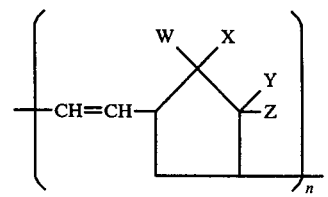

where: W, X, Y and Z denote the aforementioned radicals.

The polymers obtained present different properties from various factors, namely according as the double bond of the polymer is of the cis or trans type, or depending on the mutual substitution positions and steric positions of the substituents.

Cyano- and ester-substituted norbornene derivatives are sometimes likely to polymerize through their C=C double bond according to the following scheme, that is, vinyl polymerization.

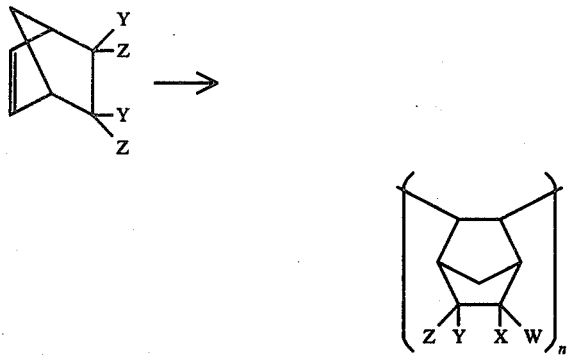

where: W, X, Y and Z denote the aforementioned radicals.

However, said vinyl polymerization produces polymer with chemical structure different from the polymers used in this invention.

Organic aluminium compounds constituting a part of the catalytic system used in the ring-opening polymerization are of the type whose chemical structure may be expressed by the general formula $AlR_3$ or $AlR_nX_{3-n}$ (where R represents the alkyl or aryl or aryl radical, X denotes halogens, hydrogen or alkoxy radical and n is 1, 1.5 or 2) or $AlR_3\text{-}H_2O$ (where the mol ratio of $H_2O$ to $AlR_3$ has a value of <1.5).

Compounds represented by $AlR_3$, i.e., trialkyl aluminium include trimethyl aluminium, triethyl aluminium, tri-n-propyl aluminium, triisopropyl aluminium, triisobutyl aluminium, trihexyl aluminium and trioctyl aluminium and triaryl aluminium such as tribenzyl aluminium and triphenyl aluminium.

Compounds denoted by $AlR_2X$ include dialkyl aluminium monohalides such as diethyl aluminium monochloride, di-n-propyl aluminium monochloride, diisobutyl aluminium monochloride, di-n-butyl aluminium monochloride, diethyl aluminium monobromide, and diethyl aluminium monoiodide; dialkyl aluminium monohydrides such as diethyl aluminium monohydride, di-n-propyl aluminium monohydride, and di-isobutyl aluminium monohydride; diaryl aluminium monohalides such as dibenzyl aluminium monochloride, diphenyl aluminium monochloride, dibenzyl aluminium monobromide, and ditolyl aluminium monochloride; and dialkyl aluminium monoalkoxides such as diethyl aluminium monoethoxide, and diisobutyl aluminium monobutoxide.

Compounds indicated by $AlR_{1.5}X_{1.5}$ include ethyl aluminium sesquichloride, ethyl aluminium sesquibromide, and isobutyl aluminium sesquichloride.

Compounds represented by $AlRX_2$ include alkyl aluminium dihalides such as ethyl aluminium dichloride, ethyl aluminium dibromide, propyl aluminium dichloride, isobutyl aluminium dichloride, ethyl aluminium dibromide, and ethyl aluminium diiodide; aryl aluminium dihalides such as benzyl aluminium dichloride, benzyl aluminium dibromide, tolyl aluminium dichloride, and phenyl aluminium dichloride; and alkyl aluminium dialkoxides such as ethyl aluminium diethoxide.

Mixtures denoted by $AlR_3\text{-}H_2O$ are mixtures of trialkyl aluminium and water in which the trialkyl aluminium accounts for at least 2 mols based on 3 mols of water. Such mixtures include, for example, mixture of triethyl aluminium and water in which said triethyl aluminium and water should be in the ratio of 1:0.5

Most preferable among the above-listed organic aluminium compounds are triethyl aluminium triisobutyl aluminium, trihexyl aluminium, diethyl aluminium monochloride, di-n-butyl aluminium monochloride, ethyl aluminium sesquichlorides, diethyl aluminium monobutoxide and a mixture of triethyl aluminium and water in which the triethyl aluminium and water bear the mole ratio of 1:0.5.

Compounds of tungsten and molybdenum partly constituting the catalytic system used in the method of this invention include halides of tungsten and molybdenum such as tungsten hexachloride, tungsten pentachloride, tungsten hexafluoride, tungsten pentafluoride, molybdenum pentachloride, molybdenum hexachloride, molybdenum pentafluoride, molybdenum hexafluoride, molybdenum pentabromochloride and molybdenum pentabromide; oxyhalides of tungsten and molybdnum such as tungsten oxytetrachloride, tungsten oxytetrabromide, tungsten oxydichloride, molybdenum oxytrichloride, and molybdenum oxytetrachloride, in addition, molybdenum dioxydiacetyl acetonate [$MoO_2(CH_3COCH=C(CH_3)O\text{-})_2$; hereinafter referred to as $MoO_2(AcAc)_2$], tungsten hexaalcoholate, tungsten hexaphenolate, tetrachlorotungsten diphenolate, tetrachlorotungsten dialcoholate, dichloromolybdenum dialcoholate, and dichloromolybdenum triphenolate; and halides of aluminium-tungsten, for example, $Al_4W_3Cl_{18}$ obtained by reducing halides of tungsten by powders of aluminium. Most preferable among the above-listed compounds of tungsten and molybdenum are molybdenum pentachloride, tungsten hexachloride, tungsten oxytetrachloride ($WOCl_4$) and $Al_4W_3Cl_{18}$. The mole ratio of organic aluminium compounds to the compounds of tungsten or molybdenum is generally more than 0.1, preferably more than 0.5. Use of less than 0.1 mol of organic aluminium compounds based on 1mol of compounds of tungsten or molybdenum failed to attain practical polymerizationactivity. A catalytic system consisting of 10 mols of organic aluminum compounds based on 1 mol of compounds of tungsten or molybdenum realized an extremely high degree of polymerization activity.

While, in the ring-opening polymerization, the above-mentioned binary catalytic system consisting of organic aluminium compounds and compounds of tungsten or molybdenum can effect the ring-opening polymerization of norbornene derivatives, addition of a third component to said binary catalytic system to convert it into a ternary system prominently promotes the polymerization activity and further varies the properties of the polymers obtained using said binary catalytic system.

Said third component may be formed of at least one compound selected from the group consisting of water, peroxides, epoxides, organic halides, acetal compounds, alcoholic compounds, phenolic compounds, orthoformic acid esters, and orthocarboxylic acid esters. The peroxides include alkyl peroxides such as t-butyl peroxide; aryl peroxides such as benzoyl peroxide; alkyl or aralkyl hydroperoxides such as t-butyl hydroperoxide and cumene hydroperoxide; hydrogen peroxide; peracids such as peracetic acid; and esters, ketones and aldehydes derived from said peracids. The epoxides include ethylene oxide, propylene oxide, butene oxide, epichlorohydrin, allkyl glycidyl ether, and butadiene monoxide. The organic halides include t-butyl hypohalite compounds; allyl halides such as allyl chloride; t-alkyl halides such as t-butyl chloride; halogenated ketones such as α-chloroacetone; and halogenated alcohols such as 2-chloroethanol. The acetal compounds include acetaldehyde diethylacetal, diethoxy methane, acetone dimethyl acetal, and dichloroacetaldehyde dimethyl acetal. The alcoholic compounds include methyl alcohol, ethyl alcohol, n-propyl alcohol, n-butyl alcohol and isobutyl alcohol.

The phenolic compounds include phenol, p-methyl phenol, p,p'-isopropylidene diphenol, 2,6-dimethylphenol, p-chlorophenol, 1,3-benzenediol and 1,3,5benzenetriol. The orthoformic acid esters include methyl orthoformate and ethyl orthoformate. The orthocarboxylic acid esters include ethyl orthoacetate, n-propyl orthopropionate and butyl orthophenylacetate. Preferable among the orthoformic acid esters and orthocarboxylic acid esters are alkyl orthoformate such as methyl orthoformate and ethyl orthoformate. Water is also an effective third component of the subject catalytic system. While the amount of the third component added varies with its type, its proportion is generally 0.1 to 6 mols, or preferably 0.3 to 3 mols based on 1 mol of compounds of tungsten or molybdenum.

While the amount of the subject catalytic system added to the monomer of norbornene derivatives varies with the type of said monomer, etc. the compounds of tungsten or molybdenum should generally be added at the rate of 0.001 to 20 mols, or preferably 0.01 to 5 mols based on 100 mols of said monomer. Addition of more than 20 mols of the compounds of tungsten or molybdenum based on 100 mols of said monomer not only results in high cost but also fails to promote the catalytic action, namely, such excess addition does not elevate the polymerization activity. Further, if unduly large amounts of said compounds of tungsten or molybdenum are used, the reaction system will contain, such amounts of residual tungsten or molybdenum compounds as will be difficult to eliminate after completion of the ring-opening polymerization. The presence of said catalytic component in the polymer obtained will undesirably color the polymer. Said coloration increases the tint of a resin composition containing such colored polymer in the subsequent operation of blending the melted polymer with the rubber-like material or molding the blended resin composition or causes the thermal deterioration of the resultant product.

As previously mentioned, the ring-opening polymerization of norbornene derivatives can be carried out using the previously described catalytic system with or without an inert organic solvent. Said inert organic solvent is preferred to be the type which does not harmfully affect the catalytic system. Typical of said solvents are aliphatic hydrocarbons such as pentane, heptane, hexane, petroleum ether and decane; aromatic hydrocarbons such as benzene, toluene and xylene; alicyclic hydrocarbons such as cyclohexane, decaline and cyclooctane; halogenized hydrocarbons such as methylene chloride, 1,2-dichloroethane, 1,2-dichloropropane, chloroform, chlorobenzene; and ethers such as diethyl ether and tetrahydrofuran. The above-listed inert organic solvents may be used alone or in combination.

The catalytic components, monomer (norbornene derivatives) and inert organic solvent (if used) may be added in various sequential orders. The typical sequence is to add first the inert organic solvent, secondly the monomer, thridly the compounds of tungsten or molybdenum, fourthly the third component (if used), and finally organic aluminium compounds. It is also possible to mix the desired compounds among the catalytic components, monomer and solvent or heat them separately before they are used in the ring-opening polymerization.

The object of the ring-opening polymerization can be fully attained, as previously described, by the ring-opening polymerization norbornene derivatives in the presence of a catalytic system consisting of compounds of tungsten and/or those of molybdenum and organic aluminium compounds or a mixture of said both types of compounds and the aforesaid third component. Yet, the molecular weight of the resultant polymer can be controlled by adding to the polymerization system α-olefins such as ethylene, propylene, butene-1 and hexene-1; internal olefins such as butene-2 and hexene-2; conjugated diolefins such as butadiene and isoprene; or nonconjugated diolefins such as 1,4-hexadiene. In this case, it is generally recommended to add 0.01 to 10 parts by weight of said molecular weight controlling agent based on 100 parts by weight of the monomer of norbornene derivatives.

As previously mentioned, the polymer can be obtained by the ring-opening polymerization of the subject monomer in the presence of an inert organic solvent or in the absence of said solvent (bulk polymerization). If used, said inert organic solvent is generally preferred to be added at the ratio of 1 to 10 parts by volume based on 1 part volume of the monomer.

The ring-opening polymerization is carried out generally at a temperature ranging from −100° C to +200° C or preferably −40° C to +100° C. At a lower temperature than −100° C, the reaction system does not display desirable polymerization activity with the resultant extremely slow progress of polymerization. In such case, progress of the polymerization consumes a great deal of time, furthermore sometimes causing a mixture of the inert organic solvent and monomer to be solidified. Conversely, a higher temperature than 200° C fails to provide a good quality of polymer prepared by ring-opening polymerization, and is practically undesirable.

The ring-opening polymerization is preferred to take place in an inert atmosphere such as, argon and nitrogen. If oxygen and moisture are present in the reaction system, then the catalytic compounds i.e., the organic aluminium compounds and the compounds of tungsten or molybdenum will be changed to obstruct the reproducibility of said polymerization.

The elimination of the catalyst residue and the recovery of the polymer produced after completion of the ring-opening polymerization may be effected by the processes customarily used in the solution polymerization of isoprene and butadiene. Namely, when a solution resulting from the ring-opening polymerization, that is, a solution containing the polymer obtained by said polymerization, the unreacted portion of the monomer and the catalyst residue is poured into lower alcohol, for example, methyl alcohol or ethyl alcohol containing a small amount of hydrochloric acid, then the catalyst residue will be eliminated and the polymer produced will be precipitated at the same time. The object of the elimination of the catalyst residue and the recovery of the polymer can be further achieved by first uniformly diluting the solution resulting from the ring-opening polymerization using solvent immiscible with water, for example, methylene chloride, then by treating said solution with water containing a chelating agent such as nitrilotriacetic acid or ethylene diamine tetraacetic acid to eliminate the catalyst residue and afterwards by recovering the polymer and the organic solvent by the steam stripping process.

The polymers prepared by ring-opening polymerization of cyano- or ester-substituted norbornene derivatives include not only homopolymers of cyano- or ester-substituted norbornene derivatives obtained by the above-mentioned process but also copolymers prepared by the ring-opening polymerization of a mixture of the cyano- or ester-substituted norbornene derivatives as a main component and other cycloolefinic compounds which is carried out in the same manner as in producing the homopolymers of said cyano- or ester-substituted norbornene derivatives.

Other cycloolefinic compounds used as comonomers in producing the above-mentioned copolymers typically include monocyclic olefins such as cyclopentene, cycloheptene, cyclooctene and cyclododecene; non-conjugated cyclopolyenes such as 1,5-cyclooctadiene, cyclopentadiene, 1,5,9-cyclododecatriene, 1-chloro, 1,5-cyclooctadiene and norbornadiene (bicyclo[2,2,1]-hepta-2,5-diene); acid anhydride type norbornene derivatives such as 3,6-methylene-1,2,3,6-tetrahydro-cis-phthalic anhydride, 6-(5-carboxy-bicyclo[2,2,1]-hepta-2-enyl) acetic anhydride, 3,6-methano-1-methyl-1,2,3,6-tetrahydro-cis-phthalic anhydride, 2-oxa-1,4-dioxo-5,8-methano-1,2,3,4,4a,5,8,8a-octahydronaphthalene, 5,8-methano-1,2,3,4,4a,5,8,8a-octahydro naphthalene-1,2-dicarboxylic anhydride, 5,8-methano-1-methyl-1,2,3,4,4a,5,8,8a-octahydronaphthalene-2,3-dicarboxylic anhydride, 1,4,5,8-dimenthano-1,2,3,4,4a,5,8,8a-octahydronaphthalene-2,3-dicarboxylic anhydride, 2-oxa-1,3-dioxo-1,2,3,4,4a,5,8,8a,9,9a,10,10a-dodecahydroanthracene and 4-(5-bicyclo[2,2,1]-hepta-2-enyl)p-thalic anhydride; halogen type norbornene derivatives such as 5-chloro-bicyclo[2,2,1]-heptene-2, 5,5,-dichloro-bicyclo[2,2,1]-heptene-2,5,6-dichloro-bicyclo[2,2,1]-heptene-2, 5,5,6-trichloro-bicyclo[2,2,1]-heptene-2, 5,5,6,6-tetrachloro-bicyclo[2,2,1]-heptene-2, 5-chloromethyl-bicyclo[2,2,1]-heptene-2 and 5-chloro-5-methyl-bicyclo[2,2,1]--heptene-2, and other halogen type norbornene derivatives obtained by substituting bromine for the chlorine included in the above-listed halogen type norbornene derivatives; ether type norbornene derivatives such as 5-methoxy-bicyclo[2,2,1]--heptene-2, 5-ethoxy-bicyclo[2,2,1]-heptene-2, 5-n-propoxy-bicyclo[2,2,1]-heptene-2, 5-isopropoxy-bicyclo[2,2,1]--heptene-2, 5-n-butoxy-bicyclo[2,2,1]-heptene-2, 5-cyclohexoxy-bicyclo[2,2,1]-heptene-2, 5-cyclohexoxy-bicyclo[2,2,1]-heptene-2, 5-methoxymethyl-bicyclo[2,2,1]-heptene-2, 5-butoxymethyl-bicyclo[2,2,1]-heptene-2, 5-methoxy-6-methoxymethyl-bicyclo[2,2,1]-heptene-2, and 5-phenoxy-bicyclo[2,2,1]-heptene-2; imide type norbornene derivatives, for example, N-substituted-3,6-methylene-1,2,3,6-tetrahydro-cis-phthalimides (the N-substituent is selected from the group consisting of alkyl radical, alkenyl radical, cycloalkyl radical, aryl radical and ester group) such as N-methyl-3,6-methylene-1,2,3,6-tetrahydro-cis-phthalimide, N-n-butyl-3,6-methylene-1,2,3,6-tetrahydro-cis-phthalimide, N-octyl-3,6-methylene-1,2,3,6-tetrahydro-cis-phthalimide, N-decyl-3,6-methylene-1,2,3,6-tetrahydro-cis-phthalimide, N-dodecyl-3,6-methylene-1,2,3,6-tetrahydro-cis-phthalimide, N-allyl-3,6-methylene-1,2,3,6-tetrahydro-cis-phthalimide, N-cyclohexyl-3,6-methylene-1,2,3,6-tetrahydro-cis-phthalimide, N-(4-methyl cyclohexyl)-3,6-methylene-1,2,3,6-tetrahydro-cis-phthalimide, N-phenyl-3,6-methylene-1,2,3,6-tetrahydro-cis-phthalimide, and N-tolyl-3,6-methylene-1,2,3,6-tetrahydro-cis-phthalimide, N-substituted 3,6-methylene-1-methyl-1,2,3,6-tetrahydro-cis-phthalimides (said N-substitution being made in the same manner as in the above-mentioned N-substituted 3,6-methylene-1,2,3,6-tetrahydro-cis-phthalimides), N-substituted bicyclo[2,2,1]-hepta-2-ene-5-spiro-3'-succinimides (said N-substitution being made in the same manner as in the above-mentioned N-substituted 3,6-methylene-1,2,3,6-tetrahydro-cis-phthalimides), N-substituted 2-aza-1,3-dioxo-5,8-methano-1,2,3,4,4a,5,8,8a-octahydronaphthalenes (said N-substitution being made in the same manner as in the above-mentioned N-substituted 3,6-methylene-1,2,3,6-tetrahydro-cis-phthalimides), N-substituted 5,8-methano-1,2,3,4,4a,5,8,8a-octahydronaphthalene-2,3-dicarboxyimides (said N-substitution being made in the same manner as in the above-mentioned N-substituted 3,6-methylene-1,2,3,6-tetrahydro-cis-phthalimides), N-substituted 1,4-methano-1,4,4a,5,6,7,8,8a-octahydronaphthalene-6-spiro-3+-succinimides (said N-substitution being made in the same manner as in the above-mentioned N-substituted 3,6-methylene-1,2,3,6-tetrahydro-cis-phthalimides), N-substituted 2-aza-1,3-dioxo-5,8-methano-1,2,3,4,4a,5,8,8a,9,9a,10,10a-dodecahydroanthracenes said N-substitution being made in the same manner as in the above-mentioned N-substituted 3,6-methylene-1,2,3,6-tetrahydro-cis-phthalimides), N-substituted 1,4,5,8-dimethano-1,2,3,4,4a,5,8,8a-octahydronaphthalene-2,3-dicarboxyimides (said N-substitution being made in the same manner as in the above-mentioned N-substituted 3,6-methylene-1,2,3,6-tetrahydro-cis-phthalimides), N-substituted 1,4,5,8-dimethano-2-methyl-1,2,3,4,4a,5,8,8a-octahydronaphthalene-2,3-dicarboxyimides (said N-substitution being made in the same manner as in the above-mentioned N-substituted 3,6-methylene-1,2,3,6-tetrahydro-cis-phthalimides), N-substituted 1,4,5,8-dimethano-1,4,4a,5,6,7,8,8a-octahydronaphthalene 6-spiro-3'-succinimides (said N-substitution being made in the same manner as in the above mentioned N-substituted 3,6-methylene-1,2,3,6-tetrahydro-cis-phthalimides), N-substituted 2-aza-5,8,9,10-dimethano-1,3-dioxo-1,2,3,4,4a,5,8,8a,9,10,10a-dodecahydroanthracenes (said N-substitution being made in the same manner as in the above-mentioned N-substituted 3,6-methylene-1,2,3,6-tetrahydro-cis-phthalimides), and N-substituted 4-(5-bicyclo[2,2,1]-hepta-2-enyl) phthalimides (said N-substitution being made in the same manner as in the above-mentioned N-substituted 3,6-methylene-1,2,3,6-tetrahydro-cis-phthalimides); aromatic norbornadiene derivatives such as 1,4-dihydro-1,4-methanonaphthalene, 1,4-dihydro-1,4-methano-6-methylnaphthalene, 1,4-dihydro-1,4-methano-6-methoxynaphthalene, 1,4-dihydro-1,4,-methano-6-methoxycarbonyl naphthalene, 1,4-dihydro-6-fluoro-1,4-methanonaphthalene, 1,4-dihydro-1,4,-methano-6-trifluoromethyl naphthalene, 1,4-dihydro-1,4-methano-5,6,7,8-tetrafluoronaphthalene, 6-chloro-1,4-dihydro-1,4-methanonaphthalene, 1,4-dihydro-1,4-methano-5,6,7,8-tetrachloronaphthalene, 5,8-diacetoxy- 1,4-dihydro-1,4-methanonaphthalene, 5,8-diacetoxy-6,7-dicyano-1,4-dihydro-1,4-methanonaphthalene, 5,8-diacetoxy-1,4-dihydro-1,4-methano-6-methyl naphthalene, 5,8-diacetoxy-1,4-dihydro-6,7-dimethyl-1,4-methanonaphthalene, 5,8-diacetoxy-1,4-dihydro-6-fluoro-1,4-methanonaphthalene, 5,8-diacetoxy-1,4-dihydro-1,4-methano-6-methoxynaphthalene, 5,8-diacetoxy-1,4-dihydro-6,7-dimethoxy-1,4-methano naphthalene, 6-cyano-1,4-dihydro-1,4-methanonaphthalene, 1,4-dihydro-1,4-methanoanthracene, 1,4-dihydro-1,4-methano-5-methylanthracene, 1,4-dihydro-1,4-methano-6-methoxycarbonyl anthracene, 9,10-diacetoxy-1,4-dihydro-1,4-methanoanthracene, 6-cyano-1,4-dihydro-1,4-methanoanthracene, and 1,4-dihydro-9,10-diphenyl-1,4methanoanthracene; ester type norbornadiene derivatives such as 2-methoxycarbonyl-bicyclo[2,2,1]-hepta-2,5-diene, 2-ethoxycarbonyl-bicyclo[2,2,1]-hepta-2,5-diene, 2-n-propyloxycarbonyl-bicyclo[2,2,1]-hepta-2,5-diene, 2-isopropyloxycarbonyl-bicyclo[2,2,1]-hepta-2,5-diene, 2-butyloxycarbonyl-bicyclo[2,2,1]-hepta-2,5-diene, 2-pentyloxycarbonyl-bicyclo[2,2,1]-hepta-2,5-diene, 2-hexyloxycarbonyl-bicyclo[2,2,1]-hepta-2,5-diene, 2-octyloxycarbonyl-bicyclo[2,2,1]-hepta-2,5-diene, 2-decyloxycarbonyl-bicyclo[2,2,1]-hepta-2,5-diene, 2-methoxycarbonyl-bicyclo [2,2,1]-hepta-2,5-diene, 2-methoxycarbonyl-3-ethyl-bicyclo [2,2,1]-hepta-2,5-diene, 2,3-dimethoxycarbonyl-bicyclo[2,2,1]-hepta-2,5-diene, 2-methoxycarbonyl-3-ethoxycarbonyl-bicyclo [2,2,1]-hepta-2,5-diene, 2,3- diethoxycarbonyl-bicyclo2,2,1]-hepta-2,5-diene, 2,3-dipropyloxycarbonyl-bicyclo[2,2,1]-hepta-2,5-diene, 2,3-dibutyloxycarbonyl-bicyclo[2,2,1]-hepta-2,5-diene, 2-methoxycarbonyl-3-butylcarbonyl-bicyclo[2,2,1]-hepta-2,5-diene, 2,3-dipentyloxycarbonyl-bicyclo[2,2,1]-hepta-2,5-diene, 2,3-dihexyloxycarbonyl-bicyclo[2,2,1]-hepta-2,5-diene, 2-methoxycarbonyl-3-hexyloxycarbonyl-bicyclo[2,2,1]-hepta-2,5-diene, 2-acetoxymethyl-bicyclo[2,2,1]-hepta-2,5-diene, 2-propionyloxymethyl-bicyclo[2,2,1]-hepta-2,5-diene, 2-butyryl-oxymethyl-bicyclo[2,2,1]-hepta-2,5-diene, 2-valeryloxymethyl-bicyclo[2,2,1]-hepta-2,5-diene, 2-caproyloxy-bicryclo [2,2,1]-hepta-2,5-diene, 2-capryloxymethyl-bicyclo[2,2,1]-hepta-2,5-diene, 2,3-di(acetoxymethyl)-bicyclo[2,2,1]-hepta-2,5-diene, 2,3-di(propionyloxymethyl)-bicyclo[2,2,1]-hepta-2,5-diene, 2,3-di(butyryloxymethyl)-bicyclo[2,2,1]-hepta-2,5-diene, 2-methoxycarbonylmethyl-bicyclo[2,2,1]-hepta-2,5-diene, 2-ethoxycarbonylmethyl-bicyclo[2,2,1]-hepta-2,5-diene, 2-propyloxycarbonylmethyl-bicyclo[2,2,1]-hepta-2,5-diene, 2-methoxycarbonyl-3-propyl-bicyclo[2,2,1]-hepta-2,5-diene, 2-methoxycarbonyl-3-hexyl-bicyclo[2,2,1]-hepta-2,5-diene, 2-methoxycarbonyl-3-cyclohexyl-bicyclo[2,2,1]-hepta-2,5-diene, 2-methoxycarbonyl-3-phenyl-bicyclo[2,2,1]-hepta-2,5-diene, 2-acetoxymethyl-3-methyl-bicyclo[2,2,1]-hepta-2,5-diene, 2-acetoxymethyl-3-ethyl-bicyclo[2,2,1]-hepta-2,5-diene, 2-acetoxymethyl-3-phenyl-bicyclo[2,2,1]-hepta-2,5-diene, 2-propionyloxymethyl-3-methyl-bicyclo[2,2,1]-hepta-2,5-diene, and 2-valeryloxymethyl-3-phenyl-bicyclo[2,2,1]-hepta-2,5-diene; bicyclo[2,2,1]-heptene-2(norbornene); and 1,4; 5,8-dimethano-1,2,3,4,4a,5,8,8a-octahydronapthalene.

Where the above-mentioned copolymers of cyano- or ester-substituted norbornene derivatives are used in producing the resin compositions of this invention, it is preferred that said copolymers be formed by ring-opening polymerization of a mixture containing one mol at most of other cycloolefinic compounds based on one mol of cyano- or ester-substituted norbornene derivatives. Where said other cycloolefinic compounds, for example monocyclic olefins such as cyclopentene and cyclooctene are used at the rate of more than one mol based on one mol of cyano- or ester-substituted norbornene derivatives, then the resin composition containing the resultant copolymers will have lower surface hardness and softening point.

The rubber-like materials blended with the ring-opening polymerization product of cyano- or ester-substituted norbornene derivatives include butadiene rubbers, chlorinated polyethylene rubbers, and polyisoprene rubbers.

The butadiene rubbers are polybutadiene rubber and copolymers prepared by copolymerizing butadiene as a main component with a small amount of such monomer as styrene or acrylonitrile. These copolymers may be of the random copolymerized or block copolymerized type. The butadiene rubbers are generally manufactured by emulsion polymerization, using a free-redical initiator as a catalyst or by solution polymerization, using organic lithium compounds, for example, n-butyl lithium as a catalyst.

The chlorinated polyethylene rubbers are prepared by chlorinating a high density (0.93 to 0.98 g/cc) ethylene homopolymer or a copolymer of ethylene and a small amount (generally less than 10 mol %) of α-olefin such as propylene or butene-1 in a solvent or aqueous suspension. The preferred chlorinated polyethylene rubbers are those which contain particularly 25 to 45% by weight of chlorine.

The polyisoprene rubbers are prepared in an organic solvent using a catalyst of lithium, organic lithium compounds or the so-called Ziegler catalyst (for example, the catalyst consisting of titanium tetrachloride and triethyl aluminium). The isoprene contains two double bonds and may be formed in four types of addition polymerization such as 1,2; 3,4; cis-1,4; and trans-1,4 depending on the conditions of polymerization. As used of this invention, the optimum polyisoprene rubbers are those which contain a large number of, particularly more than 90% of cis-1,4 bonds.

In the composition of this invention the proportion of the rubber-like material is chosen to be 2 to 25 parts by weight relative to 100 parts by weight of polymers prepared by ring-opening polymerization of norbornene derivatives.

The polymer prepared by ring-opening polymerization of norbornene derivatives according to this invention may be blended with the rubber-like material by the customary process of incorporating general synthetic resin or rubber-like material. Said blending may be effected by a mixer, for example, a hot roll mill, Banbury mixer or extruder, while maintaining both components in a molten state.

As mentioned above, the composition of this invention displays not only prominent impact strength, but also high weatherability and transparency. Even where blended with a relatively large amount of rubber-like material, the present composition is often little reduced in surface hardness and softening point. Most of the composition containing the ring-opening polymerization products of cyano-substituted norbornene derivatives particularly indicate high resistance to organic solvents such as ethyl alcohol, isopropyl alcohol, n-hexane, ethyl ether, carbon tetrachloride and tetrachloroethylene.

Where the composition of this invention is manufactured, a single type of rubber-like material is generally incorporated. However, two or more kinds of said rubber-like material may be incorporated, depending on the object for which the composition is intended. It is possible to blend the composition of this invention with any combination of homogeneously miscible synthetic resins such as homopolymer or copolymers of vinyl chloride, acrylonitrile-butadiene-styrene resin (ABS resin) and methyl methacrylate resin (PMMA resin). Further according to the object of this invention, the composition of this invention may be impregnated for further elevation of its function with general resin additives such as stabilizers to rays (ultraviolet rays), heat, oxygen and ozone, fire retardants, plasticizers, lubricants, reinforcing agents, fillers, coloring agents, antistatic agents, foaming agents, and electric property improvers.

The resin compositions of this invention can be molded by compression molding, extrusion molding, injection molding, blow molding and casting applied to general types of synthetic resin into various products such as sheets, boards, rods, spheres, pipes, films including secondary worked articles, for example, bags, packing material, containers such as bottles, electrical parts including illumination implements, daily sundry goods, furniture, toys, agricultural tools and their parts, machine parts, etc.

This invention will be more fully understood with reference to the examples and controls which follow. Throughout the examples and controls, the Vicat softening point was determined with a test piece 3 mm thick by measuring the temperature (° C) at which a needle was inserted 1 mm into the test piece according to the Vicat softening point testing method set forth in ASTM D-1525-58T. The Rockwell hardness represents a value of the surface hardness (R) of the test piece measured at 20° C pursuant to ASTM D-785-51. The Izod impact strength was measured by using a notched test piece 3 mm thick in a thermostat at 20° C according to ASTM D-256-56. The tensile strength and the elongation denote a value measured by stretching a Type 1 dumbbell shaped test piece 3 mm thick at a speed of 5 mm/min in a thermostat at 23° C according to ASTM D-638-58T. The melt viscosity was measured by subjecting the resin to a load of 100 kg at 200° C using the Koka type flow tester provided with a nozzle 1 mm in diameter and 10 mm long.

EXAMPLE 1

A dried nitrogen-filled 10l autoclave was charged with 4500 ml of 1,2-dichloroethane, 1500 ml (12 mols) of 5-cyano-bicyclo[2,2,1]-heptene-2-(cyanonorbornene) monomer, 10.1 ml of n-hexene-1 (0.12 mol) and 120 ml of a 1,2-dichloroethane solution containing 0.2 mol of hexachlorotungsten-acetaldehyde dimethylacetal (both components bear a molar ratio of 1:2 and the hexachlorotungsten amounts to 24 millimols, namely, accounts for 0.2 mol% based on the above-mentioned monomer). The reaction system was heated to 70° C. 11.9 ml (96 millimols) of diethyl aluminium chloride was added to the reaction system. After polymerization was conducted for 5 hours with stirring, the reaction system was treated with 200 ml of ethanolamine and 10g of bis(2-hydroxy-3-t-butyl-5-methyl phenyl) methane (manufactured by Yoshitomi Chemicals Mfg. Co. under the trade name "Yoshinox 2246") as a stabilizer. The mass was further stirred for 30 minutes at the same temperature. The resultant system (or a solution containing the polymer produced) was diluted with 1,2-dichloroethane (said polymer has a concentration of about 10% by weight). 4000 ml of an aqueous solution containing 1% by weight of trisodium salt of nitrilotriacetic acid was added, followed by vigorous stirring for 30 minutes at 20° C. After allowed to stand, the mass was separated into a phase of water and that of the 1,2-dichloroethane, followed by removal of the water phase. After this operation was repeated three times, water washing was carried out. When the pH of the solution was determined to be 7, the polymer was precipitated for separation by addition of a large amount of methyl alcohol. The polymer thus purified was dried overnight at 50° C in vacuum of less than 1 mm Hg, providing 1150g of substantially colorless transparent polymer. The conversion accounted for 80 per cent of the raw monomer. The product polymer had an intrinsic viscosity of 0.64, Izod impact strength of 6.3 kg.cm/cm-notched, Vicat softening point of 126° C, Rockwell hardness R of 127.

The polymer obtained had a tensile strength of 470 kg/cm$^2$ and an elongation of 230%.

100 parts by weight of the above-mentioned polymer (namely, a ring-opening polymerization product of 5-cyano-bicyclo[2,2,1]-heptene-2) were kneaded with 10 parts by weight of polybutadiene rubber having a Mooney viscosity of 45 (ML$_{1+4}$, 100° C) and containing 97.5% of cis-1,4 bond (manufactured by Japan Synthetic Rubber Co., Ltd. under a trade name "BR-40l") and 0.5 part by weight of bis (2-hydroxy-3-t-butyl-5-methylphenyl) methane for 5 minutes on a roll mill whose surface temperature was set at 175° C. The mixture obtained was thermally pressed for 3 minutes at a pressure of 50 kg/cm$^2$ on a hot press maintained at 200° C, and further pressed for 2 minutes at a pressure of 50 kg/cm$^2$ on a water-cooled press, providing a plate 3 mm thick. The plate obtained had an Izod impact strength of 56.8 kg.cm/cm-notched, a Rockwell hardness R of 127, a Vicat softening point of 125° C. The pressed plate had a smooth surface, indicating no blooming.

EXAMPLE 2

Kneading was carried out on a roll mill in substaintally the same manner as in Example 1, excepting that the polybutadiene rubber of Example 1 was replaced by styrene-butadiene copolymer containing 23.5 percent by weight of styrene and having a Mooney viscosity of 50 (manufactured by Japan Synthetic Rubber Co., Ltd. under a trade name "JSR-1502"). The mixture was pressed as in Example 1 to provide a plate, whose physical properties are set forth in Table 1 given later. The plate had a smooth surface, presenting no blooming.

EXAMPLE 3

Kneading was carried out on a roll mill in substantially the same manner as in Example 1, excepting that the polybutadiene rubber of Example 1 was replaced by acrylonitrilebutadiene copolymer containing 33 percent by weight of acrylonitrile and having a Mooney viscosity of 80 (manufactured by Japan Geon Co. under a trade name "Hycar 1042").

The mixture was pressed in the same manner as in Example 1 to produce a plate, whose physical properties are given in Table 1. The plate had a smooth surface showing no blooming.

EXAMPLE 4

Kneading was carried out on a roll mill in substantially the same manner as in Example 1, excepting that the polybutadiene rubber of Example 1 was replaced by polyisoprene rubber having a Mooney viscosity of 86 (manufactured by B. F. Goodrich Co. under a trade name "Ameripol SN 600"). The mixture was pressed in the same manner as in Example 1 to provide a plate whose physical porperties are presented in Table 1.

EXAMPLE 5

Kneading was carried out on a roll mill in substantially the same manner as in Example 1, excepting that the polybutadiene rubber of Example 1 was replaced by styrene-butadiene random copolymer containing 25 percent by weight of styrene and having a Mooney viscoisty of 58 (manufactured by A. A. Chemical Co. under a trade name "Solprene 1204"). The mixture was pressed in the same manner as in Example 1 to provide a plate whose physical properties are indicated in Table 1.

EXAMPLE 6

Kneading was carried out on a roll mill in substantially the same manner as in Example 1, excepting that the polybutadiene rubber of Example 1 was replaced by acrylonitrilebutadiene copolymer containing 38 percent by weight of acrylonitrile and having a Mooney viscosity of 80 (manufactured by Japan Geon Co. under a trade name "Hycar 1041"). The mixture was pressed in the same manner as in Example 1 to provide a plate whose physical properties are shown in Table 1.

EXAMPLE 7

Kneading was carried out on a roll mill in substantially the same manner as in Example 6, excepting that the acrylonitrile-butadiene rubber of Example 6 was replaced by acrylonitrile-butadiene copolymer containing 28 percent by weight of acrylonitrile and having a Mooney viscosity of 75 (manufactured by Japan Geon Co. under a trade name "Hycar 1043"). The mixture was pressed in the same manner as in Example 1 to produce a plate having prominent transparency. The other properties are set forth in Table 1. The plate had a smooth surface, showing no blooming.

EXAMPLE 8

Kneading was carried out on a roll mill in substantially the same manner as Example 1, excepting that the polybutadiene rubber of Example 1 was replaced by styrene-butadiene block copolymer containing 25 percent by weight of styrene and having a Mooney viscosity of 47 (manufactured by A.A. Chemical Co. under a trade name "Solprene 1205"). The mixture was pressed in the same manner as in Example 1 to produce a plate whose physical properties are given in Table 1. The plate had a smooth surface, presenting no blooming.

Table 1

| Ex. No. | Izod impact strength (kg.cm/cm -notched) | Tensile strength (kg/cm$^2$) | Elongation (%) | Rockwell hardness (R) | Vicat Softening point (° C) |
|---|---|---|---|---|---|
| 2 | 96.1 | 415 | 190 | 127 | 121 |
| 3 | 106.8 | — | — | 127 | 122 |
| 4 | 80.2 | — | — | 127 | — |
| 5 | 93.9 | — | — | 127 | — |
| 6 | 103.0 | — | — | 127 | — |
| 7 | 73.7 | — | — | 127 | — |

Table 1-continued

| Ex. No. | Izod impact strength (kg.cm/cm -notched) | Tensile strength (kg/cm$^2$) | Elongation (%) | Rockwell hardness (R) | Vicat Softening point (° C) |
|---|---|---|---|---|---|
| 8 | 84.4 | — | — | 127 | 124 |

EXAMPLE 9

Kneading was carried out on a roll mill in substantially the same manner as in Example 1, excepting that the polybutadiene rubber of Example 1 was replaced by chlorinated polyethylene containing 30 percent by weight of chlorine and having a Mooney viscosity of 68 ($MS_{1+4}$, 100° C) (manufactured by Showa Denko K.K. under a trade name "Elaslen 301A"). The mixture was presssed in the same manner as in Example 1 to provide a plate whose physical properties are set forth in Table 2. The plate had a smooth surface, presenting no blooming.

EXAMPLE 10

Kneading was carried out on a roll mill in substantially the same manner as in Example 9, excepting that the chlorinated polyethylene of Example 9 was replaced by another type of chlorinated polyethylene containing 40 percent by weight of chlorine and having a Mooney viscosity of 76 (manufactured by Showa Denko K.K. under a trade name "Elaslen 401A"). The mixture was pressed in the same manner as in Example 1 to produce a plate whose physical properties are shown in Table 2. The plate was prominently transparent and had a smooth surface, indicating no blooming.

Table 2

| Example No. | Izod impact strength (kg.cm/cm-notched) | Rockwell hardness (R) |
|---|---|---|
| 9 | 73.3 | 128 |
| 10 | 90.8 | 128 |

EXAMPLE 11

Kneading was carried out on a roll mill in substantially the same manner as in Example 2, excepting that the proportion of the styrene-butadiene rubber of Example 2 was changed to 3 parts by weight. The mixture was pressed in the same manner as in Example 1 to provide a plate whose physical properties are given in Table 3. The plate had a smooth surface, indicating no blooming.

EXAMPLE 12

Kneading was carried out on a roll mill in substantially the same manner as in Example 2, excepting that the proportion of the styrene-butadiene rubber was changed to 20 parts by weight. The mixture was pressed in the same manner as in Example 1 to produce a plate whose physical properties are shown in Table 3.

EXAMPLE 13 (Control)

Kneading was carried out on a roll mill in substantially the same manner as in Example 2, excepting that the proportion of the styrene-butadiene rubber was changed to 35 parts by weight. The mixture was pressed in the same manner as in Example 1 to produce a plate whose physical properties are set forth in Table 3.

Table 3

| Ex.-No. | proportion (parts by weight) | Izod impact strength (kg.cm/cm-notched) | Tensile strength (kg/cm²) | Elongation (%) | Rockwell hardness (R) | Vicat softening point (° C) |
|---|---|---|---|---|---|---|
| 11 | 3 | 63.6 | — | — | 128 | 124 |
| 12 | 20 | 103.2 | 315 | 130 | 126 | 121 |
| 13 | 35 | 98.0 | 203 | 170 | 120 | 115 |

EXAMPLE 14 (Control)

Kneading was carried out on a roll mill in substantially the same manner as in Example 9, excepting that the proportion of the chlorinated polyethylene of Example 9 was changed to 35 parts by weight. The mixture was pressed in the same manner as in Example 1 to form a plate which had an Izod impact strength of 66.0 kg.cm/cm-notched, a Rockwell hardness R of 117, Vicat softening point of 113° C, tensile strength of 212 kg/cm² and elongation of 150%.

CONTROL 1

Kneading was carried out on a roll mill in substantially the same manner as in Example 9, excepting that the proportion of the chlorinated polyethylene of Example 9 was changed to 100 parts by weight. The mixture was pressed in the same manner as in Example 1 to form a plate which had an Izod impact strength of 40.2 kg.cm/cm-notched and displayed rubber-like properties at 20° C, preventing determination from being made of Rockwell hardness R and Vicat softening point.

EXAMPLE 15

Ring-opening polymerization of the 5-cyano-bicyclo[2,2,1]-heptene-2 of Example 1 was effected in substantially the same manner as in Example 1, excepting that 1.5 mol% of n-hexene-1 based on the monomer was further added as a molecular weight controlling agent. As the result of the same after treatment (purification) as in Example 1, there was obtained a polymer weighing 1170g. The polymer obtained was substantially transparent, and had an intrinsic viscosity of 0.25, an Izod impact strength of 1.5 kg.cm/cm-notched, Vicat softening point of 103° C, melt flow index of 15.0 g/10 min (as measured according to the process of ASTM D-1238-58T at a temperature of 190° C and under a load of 2.16 kg), Rockwell hardness R of 125, tensile strength of 380 kg/cm² and elongation of 10%.

Further, kneading was carried out on a roll mill in substantially the same manner as in Example 2, excepting that the polymer of 5-cyano-bicyclo[2,2,1]-heptene-2 prepared by ring-opening polymerization in Example 2 was replaced by the polymer of 5-cyano-bicyclo[2,2,1]-heptene-2 prepared by the above-mentioned ring-opening polymerization process. The mixture had a melt flow index of 18.0 g/10 min. This mixture was pressed in the same manner as in Example 1 to form a plate which had an Izod impact strength of 6.3 kg.cm/cm-notched, Rockwell hardness R of 123, tensile strength of 360 kg/cm² and elongation of 15%.

EXAMPLE 16

Ring-opening polymerization was conducted in substantially the same manner as in Example 1, excepting that 12 mols of the 5-cyano-bicyclo[2,2,1]-heptene-2 of Example 1 was replaced by the same mols (1332g) of 5-cyano-5-methyl-bicyclo[2,2,1]-heptene-2. Upon completion of the ring-opening polymerization, purification was effected in the same manner as in Example 1, providing a polymer weighing 1100g. This polymer had an intrinsic viscosity of 0.77, Izod impact strength of 78 kg.cm/cm-notched, Vicat softening point of 148° C, Rockwell hardness R of 127, tensile strength of 630 kg/cm² and elongation of 250%.

Further, kneading was carried out in substantially the same manner as in Example 2, excepting that the polymer of 5-cyano-bicyclo[2,2,1]-heptene-2 of Example 2 was replaced by that of 5-cyano-5-methyl-bicyclo[2,2,1]-heptene-2 prepared by the above-mentioned ring-opening polymerization process. The mixture was pressed as in Example 1 to form a plate which had an Izod impact strength of 98.3 kg.cm/cm-notched, Rockwell hardness R of 127, Vicat softening point of 146° C, tensile strength of 520 kg/cm² and elongation of 210%.

EXAMPLE 17

Ring-opening polymerization was carried out in substantially the same manner as in Example 1, excepting that 12 mols of the 5-cyano-bicyclo[2,2,1]-heptene-2 of Example 1 was replaced by the same mols (1442g) of 5,6-dicyano-bicyclo[2,2,1]-heptene-2. Upon completion of the ring-opening polymerization, purification was effected in the same manner as in Example 1, providing a polymer weighing 903g. This polymer was substantially transparent and had an intrinsic viscosity of 0.43, Izod impact strength of 3.8 kg.cm/cm-notched, Rockwell hardness R of 127, tensile strength of 530 kg/cm² and elongation of 15%.

Kneading was carried out on a roll mill in the same manner as in Example 2, excepting that the polymer of 5-cyano-bicyclo[2,2,1]-heptene-2 prepared by ring-opening polymerization in Example 2 was replaced by that of 5,6-dicyano-bicyclo[2,2,1]-heptene-2 prepared by the above-mentioned ring-opening polymerization process. The mixture was pressed in the same manner as in Example 1 to form a plate which had an Izod impact strength of 13.3 kg.cm/cm-notched, Rockwell hardness R of 127, tensile strength of 490 kg/cm² and elongation of 10%.

EXAMPLE 18

Ring-opening polymerization was carried out in substantially the same manner as in Example 1, excepting that 12 mols of the 5-cyano-bicyclo[2,2,1]-heptene-2 used as a monomer in Example 1 was replaced by a mixture consisting of 10 mols (1192g) of 5-cyano-bicyclo[2,2,1]-heptene-2 and 2 mols (188g) of bicyclo [2,2,1]-heptene-2 (norbornene). Upon completion of the ring-opening polymerization, purification was effected in the same manner as in Example 1, providing a copolymer weighing 1164g. This copolymer was substantially transparent and had an intrinsic viscosity of 0.67, Izod impact strength of 6.88 kg.cm/cm-notched, Vicat softening point of 122° C, Rockwell hardness R of 120, tensile strength of 470 kg/cm² and elongation of 230%.

Kneading was carried out on a roll mill in substantially the same manner as in Example 2, excepting that the polymer of 5-cyano-bicyclo[2,2,1]-heptene-2 prepared by ring-opening polymerization in Example 2 was replaced by the copolymer of 5-cyano-bicyclo[2,2,1]-heptene-2 and bicyclo[2,2,1]heptene-2 prepared by the above-mentioned ring-opening polymerization process. The mixture was pressed in the same manner as in Example 1 to produce a plate which had an Izod impact strength of 92.4 kg.cm/cm-notched, Rockwell hardness R of 118, Vicat softening point of 120° C, tensile strength of 450 kg/cm² and elongation of 220%.

EXAMPLE 19

Ring-opening polymerization was carried out in substantially the same manner as in Example 1, excepting that 12 mols of the 5-cyano-bicyclo[2,2,1]-heptene-2 used as a monomer in Example 1 was replaced by a mixture consisting of 10 mols (1192g) of 5-cyano-bicyclo[2,2,1]-heptene-2 and 2 mole (136g) of cyclopentene. Upon completion of the ring-opening polymerization, purification was effected in the same manner as in Example 1, providing a copolymer weighing 1113g. This copolymer was substantially transparent and had an intrinsic viscosity of 0.72, Izod impact strength of 10.4 kg.cm/cm-notched, Vicat softening point of 120° C, Rockwell hardness R of 119, tensile strength of 430 kg/cm² and elongation of 290%.

Kneading was carried out on a roll mill in substantially the same manner as in Example 2, excepting that the polymer of 5-cyano-bicyclo[2,2,1]-heptene-2 prepared by ring-opening polymerization in Example 2 was replaced by the copolymer of 5-cyano-bicyclo[2,2,1]-heptene-2 and cyclopentene prepared by the abovementioned ring-opening polymerization process. The mixture was pressed in the same manner as in Example 1 to provide a plate which had an Izod impact strength of 123.0 kg.cm/cm-notched, Rockwell hardness R of 119, Vicat softening point of 117° C, tensile strength of 403 kg/cm² and elongation of 280%.

As mentioned in Examples 1 to 19, the composition of this invention consisting of a polymer prepared by ring-opening polymerization of cyano-substituted norbornene derivatives and a rubber-like material is characterized in that said composition not only has a 10 to 20 times higher impact strength than said polymer alone, cut also little decreases in Rockwell hardness R. Further, the present composition can be elevated in impact strength without being much reduced in softening point and tensile strength, and also rendered transparent.

EXAMPLE 20

Ring-opening polymerization was carried out in substantially the same manner as in Example 1, excepting that 12 mols of the 5-cyano-bicyclo[2,2,1]-heptene-2 used as a monomer in Example 1 was replaced by 12 mols (1993g) of 5-methy-5-methoxycarbonylbicyclo[2,2,1]-heptene-2 used as a monomer. Upon completion of the ring-opening polymerization, purification was effected in the same manner as in Example 1, providing a substantially transparent polymer weighing 1830g. The product polymer indicated a conversion accounting for 94.8% of the raw monomer, a reduced viscosity of 0.55 and a melt viscosity of $1.1 \times 10^4$ poises. The polymer was thermally pressed for 3 minutes on a hot press maintained at 200° C at a pressure of 100 kg/cm² and then for 3 minutes on a water-cooled press at a pressure of 100 kg/cm² to form a plate 3 mm thick. The plate had an Izod impact strength of 12.3 kg.cm/cm-notched, tensile strength of 390 kg/cm², elongation of 220%, Vicat softening point of 84° C and Rockwell hardness R of 120.

100 parts by weight of the polymer prepared by the above-mentioned process (namely, a ring-opening polymerizartion product of 5-methyl-5-methoxycarbonyl-bicyclo[2,2,1]-heptene-2), 10 parts by weight of polybutadiene rubber containing 97.5% of cis-1, 4 bond and having a Mooney viscosity of 45 ($ML_{1+4}$, 100° C) (manufactured by Japan Synthetic Rubber Co., Ltd. under a trade name "BR-401") and 0.5 part by weight of bis (2-hydroxy-3-t-butyl-5-methylphenyl) methane were kneaded for 5 minutes on a roll mill whose surface temperature was maintained at 135° C. The mixture had a melt viscosity of $2.5 \times 10^4$ poises and was pressed in the same manner as in Example 1 to form a plate 3 mm thick. This plate was transparent with a faint yellow color and had an Izod impact strength of 63.5 kg.cm/cm-notched, tensile strength of 370 kg/cm², elongation of 200%, Vicat softening point of 82° C and Rockwell hardness R of 98.

EXAMPLE 21

Kneading was carried out on a roll mill in substantially the same manner as in Example 20, excepting that the polybutadiene rubber of Example 20 was replaced by the styrenebutadiene rubber of Example 2. The mixture had a melt viscosity of $2.3 \times 10^4$ poises. A plate was formed by pressing the mixture in the same manner as in Example 1. The plate was translucent with a faint yellow color and displayed such physical properties as set forth in Table 4.

EXAMPLE 22

Kneading was carried out on a roll mill in substantially the same manner as in Example 20, excepting that the polybutadiene rubber of Example 20 was replaced by the acrylonitrile-butadiene rubber of Example 3. The mixture had a melt viscosity of $4.3 \times 10^4$ poises. A plate was formed by pressing the mixture in the same manner as in Example 1. The plate was transparent with a faint yellow color and had such physical properties as shown in Table 4.

EXAMPLE 23

Kneading was carried out on a roll mill in substantially the same manner as in Example 20, excepting that the polybutadiene rubber of Example 20 was replaced by the polyisoprene rubber of Example 4. The mixture had a melt viscosity of $2.1 \times 10^4$ poises and was pressed in the same manner as in Example 1 to form a plate whose physical properties are shown in Table 4.

EXAMPLE 24

Kneading was carried out on a roll mill in substantially the same manner as in Example 20, excepting that the polybutadiene rubber of Example 20 was replaced by the styrenebutadiene random copolymer of Example 5. The mixture had a melt viscosity of $2.1 \times 10^4$ poises and was pressed in the same manner as in Example 1 to form a plate whose physical properties are indicated in Table 4.

EXAMPLE 25

Kneading was carrid out on a roll mill in substantially the same manner as in Example 20, excepting that the polybutadiene rubber of Example 20 was replaced by the acrylonitrile-butadiene rubber of Example 6. The mixture had a melt viscosity of $2.0 \times 10^4$ poises and was pressed in the same manner as in Example 1 to form a plate. This plate was transparent with a faint yellow color and displayed such physical properties as shown in Table 4.

EXAMPLE 26

Kneading was carried out on a roll mill in substantially the same manner as in Example 20, excepting that the polybutadiene rubber of Example 20 was replaced by the acrylonitrilebutadiene rubber of Example 7. The mixture had a melt viscosity of 2.6 × 10⁴ poises and was pressed in the same manner as in Example 1 to form a plate. This plate was transparent with a faint yellow color and had such physical properties as given in Table 4.

EXAMPLE 27

Kneading was carried out on a roll mill in substantially the same manner as in Example 20, excepting that the polybutadiene rubber of Example 20 was replaced by the styrenebutadiene block copolymer of Example 8. The mixture had a melt viscosity of 1.9 × 10⁴ poises and was pressed in the same manner as in Example 1 to form a plate. This plate was translucent with a faint yellow color and had such physical properties as shown in Table 4.

Table 4

| Example No. | Izod impact strength (kg/cm/cm-notched) | Tensile strength (kg/cm²) | Elongation (%) | Rockwell hardness (R) | Vicat softening point (° C) |
|---|---|---|---|---|---|
| 21 | 71.2 | 365 | 180 | 118 | 82 |
| 22 | 99.4 | 370 | 150 | 113 | 78 |
| 23 | 91.4 | 360 | 170 | 94 | 81 |
| 24 | 79.3 | 380 | 165 | 102 | 80 |
| 25 | 70.1 | 360 | 190 | 113 | 78 |
| 26 | 79.6 | 364 | 200 | 114 | 79 |
| 27 | 83.5 | 365 | 230 | 116 | 79 |

EXAMPLE 28

Kneading was carried out on a roll mill in the same manner as in Example 20, excepting that polybutadiene rubber of Example 20 was replaced by the chlorinated polyethylene of Example 9. The mixture had a melt viscosity of 2.7 × 10⁴ poises and was pressed for 3 minutes on a hot press maintained at 200° C at a pressure of 100 kg/cm² and for 3 minutes on a water-cooled press at a pressure of 100 kg/cm² to form a plate. This plate was transparent with a faint yellow color and had such physical properties as shown in Table 5.

EXAMPLE 29

Kneading was carried out on a roll mill in the same manner as in Example 28, excepting that the chlorinated polyethylene of Example 28, was replaced by another type of chlorinated polyethylene of Example 10. The mixture had a melt viscosity of 3.1 × 10⁴ poises, and was pressed for 3 minutes on a hot press maintained at 200° C at a pressure of 100 kg/cm² and for 3 minutes on a water-cooled press at a pressure of 100 kg/cm² to form a plate. This plate was transparent with a faint yellow color and had such physical properties as set forth in Table 5.

Table 5

| Example No. | Izod impact strength (kg/cm/cm-notched) | Tensile strength (kg/cm²) | Elongation (%) | Rockwell hardness (R) | Vicat softening point (° C) |
|---|---|---|---|---|---|
| 28 | 80.3 | 365 | 190 | 105 | 79 |
| 29 | 76.5 | 370 | 200 | 112 | 81 |

EXAMPLE 30

Kneading was carried out on a roll mill in substantially the same manner as in Example 21, excepting that the proportion of the styrene-butadiene rubber of Example 21 was changed to 3 parts by weight. The mixture had a melt viscosity of 1.4 × 10⁴ poises and was pressed for 3 minutes on a hot press maintained at 200° C at a pressure of 100 kg/cm² and for 3 minutes on a water-cooled press at a pressure of 100 kg/cm² to provide a plate. This plate was transparent with a faint yellow color and displayed such physical properties as given in Table 6.

EXAMPLE 31

Kneading was carried out on a roll mill in substantially the same manner as in Example 30, excepting that the proportion of the styrene-butadiene rubber of Example 30 was changed to 20 parts by weight. The mixture had a melt viscoisty of 4.8 × 10⁴ poises and was pressed in the same manner as in Example 30 to form a plate. This plate was translucent with a faint yellow color and had such physical properties as given in Table 6.

EXAMPLE 32

Kneading was carried out on a roll mill in substantially the same manner as in Example 30, excepting that the proportion of the styrene-butadiene rubber of Example 30 was changed to 35 parts by weight. The mixture had a melt viscosity of 4.8 × 10⁴ poises and was pressed in the same manner as in Example 30 to form a plate. This plate was translucent with a faint yellow color and had such physical properties as set forth in Table 6.

Table 6

| Ex.-No. | Proportion (parts by weight) | Izod impact strength (kg.cm/cm-notched) | Tensile strength (kg/cm²) | Elongation (%) | Rockwell hardness (R) | Vicat softening point (° C) |
|---|---|---|---|---|---|---|
| 30 | 3 | 53.2 | 385 | 210 | 115 | 83 |
| 31 | 20 | 120.3 | 350 | 180 | 101 | 75 |
| 32 | 35 | 100.3 | 290 | 190 | 80 | 72 |

EXAMPLE 33

Kneading was carried out on a roll mill in substantially the same manner as in Example 28, excepting that the proportion of the chlorinated polyethylene of Example 28 was changed to 35 parts by weight. The mixture has a melt viscosity of 3.9 × 10⁴ poises and was pressed in the same manner as in Example 28 to form a plate. This plate was translucent with a faint yellow color and had an Izod impact strength of 77.5 kg.cm/cm-notched, tensile strength of 295 kg/cm², elongation of 200%, Rockwell hardness R of 93 and, Vicat softening point of 76° C.

EXAMPLE 34

Ring-opening polymerization was conducted in substantially the same manner as in Example 20, excepting that 4.0 mol percent of n-hexene-1 was added to the monomer of 5-methyl-5-methoxycarbonyl-bicyclo[2,2,1]-heptene-2 of Example 20 as a molecular weight controlling agent. Upon completion of the ring-opening polymerization, the same after treatment or purification as in Example 1 was carried out, providing a polymer weighing 1720g. The conversion accounted for 89.3 percent of the raw monomer. The product polymer was colorless and transparent and had a reduced viscoisty of 0.33, and a melt viscosity of 4.3 × 10³ poises. The polymer was pressed for 3 minutes on a hot press maintained at 200° C at a pressure of 100 kg/cm² and for 3 minutes on a water-cooled press at a pressure of 100 kg/cm² to form a plate 3 mm thick. This plate had an Izod impact strength of 2.0 kg.cm/cm-notched, tensile strength of 290 kg/cm², elongation of 10%, Vicat softening point of 72° C and Rockwell hardness R of 115.

Kneading was carried out on a roll mill in substantially the same manner as in Example 21, excepting that the polymer of 5-methyl-5-methoxycarbonyl-bicyclo [2,2,1]-heptene-2 prepared by ring-opening polymerization in Example 21 was replaced by that of 5-methyl-5-methoxycarbonyl-bicyclo [2,2,1]-heptene-2 prepared by the above-mentioned ring-opening polymerization process. The mixture had a melt viscosity of $8.7 \times 10^4$ poises and was pressed in the same manner as in Example 1 to form a plate. This plate was translucent with a faint yellow color and had an Izod impact strength of 10.5 kg.cm/cm-notched, tensile strength of 275 kg/cm², elongation of 10%, Rockwell hardness R of 113 and Vicat softening point of 70° C.

EXAMPLE 35

Ring-opening polymerization was carried out in substantially the same manner as in Example 20, excepting that 12 mols of the 5-methyl-5-methoxycarbonyl-bicyclo [2,2,1]-heptene-2 used as a monomer in Example 20 was replaced by a mixture consisting of 10 mols (1662g) of said monomer and 2 mols (188g) of bicyclo [2,2,1]-heptene-2(norbornene). Upon completion of the ring-opening polymerization, purification was effected in the same manner as in Example 1, providing a copolymer weighing 1730g. The conversion accounted for 94.6% of the raw monomer. The copolymer obtained was substantially colorless and transparent and had a reduced viscosity of 0.83 and a melt viscosity of $9.3 \times 10^4$ poises. The copolymer was pressed for 3 minutes on a hot press maintained at 200° C at a pressure of 100 kg/cm² and for 3 minutes on a water-cooled press at a pressure of 100 kg/cm² to form a plate 3 mm thick. This plate had an Izod impact strength of 14.5 kg.cm/cm-notched, tensile strength of 372 kg/cm², elongation of 245%, Vicat softening point of 80° C and Rockwell hardness R of 113.

Kneading was carried out on a roll mill in substantially the same manner as in Example 21, excepting that the polymer of 5-methyl-5-methoxycarbonyl-bicyclo [2,2,1]-heptene-2 prepared by ring-opening polymerization in Example 21 was replaced by the copolymer of 5-methyl-5-methoxycarbonyl-bicyclo [2,2,1]-heptene-2 and bicyclo[2,2,1]-heptene-2 prepared by the above-mentioned ring-opening polymerization process. The mixture had a melt viscosity of $1.1 \times 10^4$ poises and was pressed in the same manner as in Example 1 to form a plate. This plate was translucent with a faint yellow color and had an Izod impact strength of 79.6 kg.cm/cm-notched, tensile strength of 360 kg/cm², elongation of 190%, Rockwell hardness R of 110 and Vicat softening point of 77° C.

EXAMPLE 36

Ring-opening polymerization was carried out in substantially the same manner as in Example 20, excepting that 12 mols of the 5-methyl-5-methoxycarbonyl-bicyclo[2,2,1]-heptene-2 used as a monomer in Example 20 was replaced by the same mols (1522g) of 5-methoxycarbonyl-bicyclo[2,2,1]-heptene-2. Upon completion of the ring-opening polymerization, purification was effected in the same manner as in Example 1, providing a polymer weighing 1410g. The conversion accounted for 92.6% of the raw monomer. The polymer obtained was substantially colorless and transparent and had a reduced viscosity of 0.92 and a melt viscosity of $7.3 \times 10^3$ poises. The polymer was pressed for 3 minutes on a hot press maintained at 100° C at a pressure of 100 kg/cm² and for 3 minutes on a water-cooled press at a pressure of 100 kg/cm² to form a plate 3 mm thick. This plate had an Izod impact strength of 10.3 kg.cm/cm-notched, tensile strength of 325 kg/cm², elongation of 200%, Vicat softening point of 74° C and Rockwell hardess R of 105.

Kneading was carried out on a roll mill in substantially the sme manner as in Example 21, excepting that the polymer of 5-methyl-5-methoxycarbonyl-bicyclo[2,2,1]-heptene-2 prepared by ring-opening polmerization in Example 21 was replaced by that of 5-methoxycarbonyl-bicyclo[2,2,1]-heptene-2 prepared by the above-mentioned ring-opening polymerization process. The mixture had a melt viscosity of $9.1 \times 10^3$ poises and was pressed in the same manner as in Example 1 to form a impact strength of 63.4 kg.cm/cm-notched, tensile strength of 302 kg/cm², elongation of 150%, Rockwell hardness R of 98 and Vicat softening point of 70° C.

EXAMPLE 37

Ring-opening polymerization was carried out in substantially the same manner as in Example 20, excepting that 12 mols of the 5-methyl-5-methoxycarbonyl-bicyclo[2,2,1]-heptene-2 used as a monomer in Example 20 was replaced by the same mols (2524g) of 5,6-dimethoxycarbonyl-bicyclo[2,2,1]-heptene-2. Upon completion of the ring-opening polymerization, purification was effected in the same manner as in Example 1, providing a polymer weighing 1850g. The conversion accounted for 74.3% of the raw monomer. The polymer was substantially colorless and transparent and had a reduced viscosity of 0.54 and a melt viscosity of $3.0 \times 10^5$ poises. The polymer was pressed for 3 minutes on a hot press maintained at 200° C at a pressure of 100 kg/cm² and for 3 minutes on a water-cooled press at a pressure of 100 kg/cm² to form a plate 3 mm thick, which had an Izod impact strength of 6.3 kg.cm/cm-notched, tensile strength of 410 kg/cm² and elongation of 60%.

Kneading was carried out on a roll mill in substantially the same manner as in Example 21, excepting that the polymer of 5-methyl-5-methoxycarbonyl-bicyclo[2,2,1]-heptene-2 prepared by ring-opening polymerization in Example 21 was replaced by that of 5,6-dimethoxycarbonyl-bicyclo[2,2,1]-heptene-2 prepared by the above-mentioned ring-opening polymerization process. The mixture had a melt viscosity of $3.3 \times 10^5$ poises and was pressed in the same manner as in Example 1 to form a plate, which had an Izod impact strength of 32.6 kg.cm/cm-notched, tensile strength of 370 kg/cm² and elongation of 50%.

EXAMPLE 38

Ring-opening polymerization was carried out in substantially the same manner as in Example 20, excepting that 12 mols of the 5-methyl-5methoxycarbonyl-bicyclo[2,2,1]-heptene-2 used as a monomer in Example 20 was replaced by the same mols (1842g) of 5-acetoxy-bicyclo[2,2,1]-heptene-2. Upon completion of the ring-opening polymerization, purification was effected in the same manner as in Example 1, providing a polymer weighing 1730g. The conversion accounted for 95.0% of the raw monomer. The polymer was substantially colorless and transparent and had a reduced viscosity of 0.64 and a melt viscosity of $7.3 \times 10^3$ poises. The polymer was pressed for 3 minutes on a hot press maintained at 200° C at a pressure of 100 kg/cm² and for 3 minutes on a water-cooled press at a pressure of 100 kg/cm² to form a plate 3 mm thick, which had an Izod impact strength of 12.4 kg/cm/cm-notched, tensile strength of 360 kg/cm², elongation of 290%, Vicat softening point of 77° C and Rockwell hardness R of 113.

Kneading was carried out on a roll mill in substantially the same manner as in Example 21, excepting that the polymer of 5-methyl-5-methoxycarbonyl-bicyclo[2,2,1]-heptene-2 of Example 21 was replaced by that of 5-acetoxy-bicyclo[2,2,1]-heptene-2 prepared by the above-mentioned ring-opening polymerization process. The mixture had a melt viscosity of $9.2 \times 10^3$ poises and was pressed in the same manner as in Example 1 to form a plate, which had an Izod impact strength of 79.1 kg.cm/cm-notched, tensile strength of 337 kg/cm², elongation of 280%, Rockwell hardness R of 105 and Vicat softening point of 70° C.

EXAMPLE 39

Ring-opening polymerization was carried out in substantially the same manner as in Example 20, excepting that 12 mols of the 5-methyl-5methoxycarbonyl-bicyclo[2,2,1]-heptene-2 used as a monomer in Example 20 was replaced by a mixture consisting of 10 mols (1662g) of the same monomer and 2 mols (136g) of cyclopentene. Upon completion of the ring-opening polymerization, purification was effected in the same manner as in Example 1, providing a copolymer weighing 162g. The conversion accounted for 90.6% of the raw monomer. The copolymer obtained was substantially colorless and transparent and had a reduced viscosity of 0.67 and a melt viscosity of $1.1 \times 10^4$ poises. The copolymer was pressed for 3 minutes on a hot press maintained at 200° C at a pressure of 100 kg/cm² and for 3 minutes on a water-cooled press at a pressure of 100 kg/cm² to form a plate 3 mm thick, which had an Izod impact strength of 17.3 kg.cm/cm-notched, tensile strength of 354 kg/cm², elongation of 230%, Vicat softening point of 82° C and Rockwell hardness R of 118:

Kneading was carried out on a roll mill in substantially the same manner as in Example 21, excepting that the polymer of 5-methyl-5-methoxycarbonyl-bicyclo[2,2,1]-heptene-2 of Example 21 was replaced by the copolymer of 5-methyl-5-methoxycarbonyl-bicyclo[2,2,1]-heptene-2 and cyclopentene prepared by the above-mentioned ring-opening polymerization process. The mixture had a melt viscosity of $2.4 \times 10^4$ poises and was pressed in the same manner as in Example 1 to form a plate, which had an Izod impact strength of 80.4 kg.cm/cm-notched, tensile strength of 330 kg/cm², elongation of 190%, Rockwell hardness R of 110 and Vicat softening point of 76° C.

EXAMPLE 40

Ring-opening polymerization was carried out in substantially the same manner as in Example 20, excepting that 12 mols of the 5-methyl-5-methoxycarbonyl-bicyclo[2,2,1]-heptene-2 used as a monomer in Example 20 was replaced by a mixture consisting of 10 mols (1662g) of the same monomer and 2 mols (238g) of 5-cyano-bicyclo[2,2,1]-heptene-2. Upon completion of the ring-opening polymerization, purification was effected in the same manner as in Example 1, providing a copolymer weighing 1805g. The conversion accounted for 95.1% of the raw monomers. The copolymer was substantially colorless and transparent and had a reduced viscosity of 0.56 and a melt viscoisty of $3.1 \times 10^4$ poises. The copolymer was pressed for 3 minutes on a hot press maintained at 200° C at a pressure of 100 kg/cm² and for 3 minutes on a water-cooled press at a pressure of 100 kg/cm² to form a plate 3 mm thick, which had an Izod impact strength of 8.6 kg.cm/cm-notched, tensile strength of 410 kg/cm², elongation of 200%, Vicat softening point of 90° C, and Rockwell hardness R of 121.

Kneading was carried out on a roll mill in substantially the same manner as in Example 21, excepting that the polymer of 5-methyl-5-methoxycarbonyl-bicyclo[2,2,1]-heptene-2 of Example 21 ws replaced by the copolymer of 5-methyl-5-methoxycarbonyl-bicyclo[2,2,1]-heptene-2 and 5-cyano-bicyclo [2,2,1]-heptene-2 prepared by the above-mentioned ring-opening polymerization process. The mixture had a melt viscosity of $5.2 \times 10^4$ poises, and was pressed in the same manner as in Example 1 to form a plate. This plate was translucent with a faint yellow color and had an Izod impact strength of 79.1 kg.cm/cm-notched, tensile strength of 385 kg/cm², elongation of 200%, Vicat softening point of 86° C and Rockwell hardness R of 112.

Control 2

Kneading was carried out on a roll mill in substantially the same manner as in Example 28, excepting that the proportion of the chlorinated polyethlene of Example 28 was changed to 100 parts by weight. The mixture presented a rubber-like state, preventing its Vicat softening point from being determined at room temperature. The mixture was pressed in the same manner as in Example 20 to form a plate, which was opaque with a faint yellow color and had an Izod impact strength of 82.5 kg.cm/cm-notched, tensile strength of 193 kg/cm², and elongation of 240%.

What we claim is:

1. High impact resin compositions comprising 100 parts by weight of polymer prepared by ring-opening polymerization of at least one kind of cyano-substituted norbornene derivatives and 2 to 25 parts by weight of rubber-like material, said cyano-substituted norbornene derivatives being expressed by the general formula:

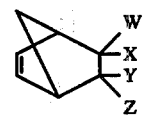

where: W, X, Y and Z are radicals selected from the group consisting of hydrogen, nitrile group, substituent containing nitrile group, alkyl radical having 1 to 20 carbon atoms, alkenyl radical having 2 to 20 carbon atoms, aryl radical having 6 to 20 carbon atoms and aralkyl radical having 7 to 20 carbon atoms, at least one of said W, X, Y and Z being a radical selected from the group consisting of nitrile group and substituent containing nitrile group, said rubber-like material being at least one kind selected from the group consisting of butadiene rubbers, chlorinated polyethylene rubbers, and polyisoprene rubbers.

2. High impact resin compositions according to claim 1 wherein said polymers prepared by ring-opening polymerization are copolymers prepared by ring-opening polymerization of the cyano-substituted norbornene derivatives together with other cycloolefinic compounds selected from the group consisting of monocyclic olefins, nonconjugated cyclopolyenes, acid anhydride type norbornene derivatives, halogen type norbornene derivatives, ether type norbornene derivatives, imide type norbornene derivatives, aromatic norbornadiene derivatives, ester type norbornadiene derivatives, bicyclo[2,2,1]-heptene-2 and 1,4; 5,8-dimethano-1,2,3,4,4a5,8,8a-octahydronaphthalene.

* * * * *